United States Patent Office 2,758,107
Patented Aug. 7, 1956

2,758,107

POLYMERIZATION OF ETHYLENE WITH BIS-DIAZOBENZENESUCCINATE

Randall G. Heiligmann and Palmer B. Stickney, Columbus, Ohio, assignors, by mesne assignments, to The Borden Company, New York, N. Y., a corporation of New Jersey No Drawing. Application August 1, 1951,
Serial No. 239,839

1 Claim. (Cl. 260—94.9)

The invention here presented is a process and catalyst for the polymerization of organic chemical unsaturates, especially ethylene, utilizing an organic polymerization catalyst in the form of an ester of a diazotate hydroxide.

Organic unsaturates have been polymerized by a considerable number of processes using a wide variety of catalysts, but, of the organic unsaturates in general, ethylene has been resistant to polymerization and has required very high pressures, on the general order of 1000 to 2000 atmospheres, in cooperation with very special catalysts. The first, and to the present preferred, catalyst has been oxygen or an oxygen-yielding compound. Oxygen as such is a usable catalyst; numerous organic peroxides, including the dialkyl peroxides, diacyl peroxides, alkylperoxy dicarbonates, and various other peroxide compounds are also effective in different degrees. However, these catalysts tend strongly to leave oxygen atoms in the polymer, the presence of which contributes very greatly to depolymerization and molecular breakdown as well as considerable modification in the physical properties of the polymer. Other catalysts or initiators have been found in the metallo-organic compounds such as n-butyl lithium. The above-named catalysts possess many shortcomings, some tending strongly towards cross-linking between molecules to produce polymers of very low solubility while others yield polymers of low molecular weight and low tensile strength. Many of these catalysts are also unstable chemical compounds which are hazardous to store, hazardous to handle, and hazardous to use.

The present invention provides a new class of polymerization catalysts for the organic unsaturates generally, which is particularly useful for the polymerization of a refractory olefin such as ethylene. This catalyst is a compound having the structure

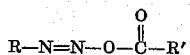

in which R is preferably an aromatic radical and R' may be either an aromatic or an aliphatic radical or hydrogen. One or more compounds of this general type may be used as a polymerization catalyst with the organic unsaturate, usually preferably under pressure, with normally gaseous olefins, which pressures are, however, considerably lower than are usually used for polymerization by the oxygen-containing catalysts. These catalysts are crystalline non hygroscopic solids or stable oily liquids, both of which are easily handled in the polymerization process with no significant hazard. They do not break down easily, do not ignite spontaneously, do not explode under normal handling conditions, and do not yield poisonous vapors.

In the polymerization reaction, the catalyst is placed in an appropriate reactor suitable for use at elevated pressures. The gaseous olefin is then added and appropriate pressures built up with maintenance of the compressed material and catalyst at an appropriate temperature to yield the desired polymer, which usually has a relatively high molecular weight. Other objects and details of the invention will be apparent from the following particularized description.

The catalyst to be used may be selected from a considerable group of similar substances. The essence of the invention in the catalyst is the use of a substance having the essential grouping shown between the vertical bars in the following formula:

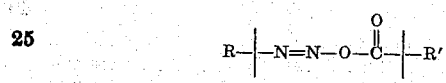

As above pointed out, the radical R is preferably an aromatic residue although it may be linked to the nitrogen through one or more aliphatic carbon atoms. Similarly, the radical R' may be either an aliphatic or an aromatic residue or hydrogen.

A well-known example of this type of compound is benzene diazoacetate,

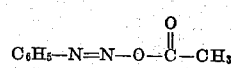

The properties of this compound, and particularly its decomposition, have been described by W. A. Waters, J. Chem. Soc. (London), 137, 113. The methods of preparation described by H. France, J. Chem. Soc. (London), 1940, 370, for this and similar compounds are quite general and can be used to prepare numerous derivatives of this type.

Another embodiment of this invention is the use of a diazotate di-ester of a dicarboxylic acid, such as bis-benzenediazosuccinate:

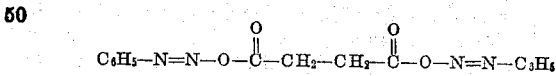

It will be noted that this catalyst is a di-ester and it appears that the di-esterified character, yielding two of the effective structure units per molecule, is particularly effective as a polymerization catalyst.

Other forms of the catalyst which are also effective are found in the examples listed in Table I.

TABLE I

| Compound | Structure | M. P. (°C.) |
| --- | --- | --- |
| Benzenediazoformate | $C_6H_5N=N-O-\overset{O}{\underset{\|}{C}}-H$ | 45–46 (decomposition). |
| Benzenediazoacetate | $C_6H_5N=N-O-\overset{O}{\underset{\|}{C}}-CH_3$ | 50 (decomposition). |
| Bis-benzenediazosuccinate | $C_6H_5N=N-O-\overset{O}{\underset{\|}{C}}(CH_2)_2\overset{O}{\underset{\|}{C}}-O-N=N-C_6H_5$ | 111 (decomposition). |
| 3-Phenylbenzenediazoacetate | $m\text{-}C_6H_5C_6H_4N=N-O-\overset{O}{\underset{\|}{C}}-CH_3$ | 78 (decomposition). |
| 1,4-Benzene-bis-diazoacetate | $C_6H_4(N=N-O-\overset{O}{\underset{\|}{C}}-CH_3)_2$ | 124 (decomposition). |
| α-Toluenediazo-benzoate | $C_6H_5CH_2-N=N-O-\overset{O}{\underset{\|}{C}}-C_6H_5$ | 47–48. |

These six compounds are representative of a wide range of similar catalysts which are all characterized by the presence of one or more of the typical unit structures as follows:

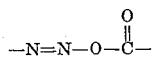

It may be noted that it is of the essence of the present invention that the catalyst is an ester formed from a diazohydroxide and an organic acid.

In practicing the process of the present invention, a portion of the catalyst is placed in a suitable polymerization reactor. A portion of the unsaturate to be polymerized is then added and the reactor brought to a suitable temperature and pressure. One of the novel characteristics of members of this class of catalysts is their ability to form polymer under mild conditions, i. e., low temperatures and pressures. The preferred temperatures usually lie between about +35° C. and +250° C. although occasionally it is desirable to work below 35° C. The unsaturate, if gaseous, is usually brought under significant pressure, which may range from about 1000 p. s. i. to 10,000 p. s. i., although with most of these catalyst substances the preferred polymerization pressure lies between about 4000 p. s. i. and 10,000 p. s. i.

The amount of catalyst normally required usually lies between the range of about 0.01 per cent and 2 per cent of the amount of material to be polymerized. The polymerization of a normally gaseous olefin, such as ethylene, may be carried out as a batch process, a suitable amount of catalyst being placed in the reactor and the compressed ethylenic unsaturate added. The reactor is heated to the desired temperature and the reaction proceeds until the desired conversion occurs, or the catalyst is exhausted, or the pressure drops to the minimum at which polymerization can proceed. The reaction may be allowed to proceed on a single filling of compressed gas, in which case the reaction slows down and finally stops, as the pressure decreases from the conversion of gaseous olefin into solid polymer. Alternatively, however, and preferably, the pressure may be maintained by the addition of further quantities of compressed gas, the pressure being maintained at optimum value until the catalyst power is exhausted. Alternatively, also, a continuous process may be utilized in which containing amounts of compressed gas and catalyst are simultaneously added to the reactor, the simultaneous addition of catalyst and unsaturate being conducted until a suitable amount of polymer has accumulated in the reactor, whereupon the catalyst and unsaturate stream may be switched to another reactor, the pressure on the filled reactor released, and the polymer removed by an appropriate means.

The following examples show in greater detail the precise operation of the process and catalyst:

Example 1

A stainless steel pressure reactor was prepared by first placing in it 1.2 parts of bis-benzenediazosuccinate as above described, then evacuating the air with a vacuum pump, filling with ethylene, and re-evacuating to remove, as far as possible, all traces of air (in some instances, the reactor was further washed by passing a slow stream of ethylene through it for a few minutes). This procedure effectively removed atmospheric oxygen. The ethylene pressure was then built up in the reactor to 5000 P. S. I. and the temperature was brought to 70° C. The reactor was held at this temperature for 15 hours, whereupon the unpolymerized ethylene was released and the polymer removed. About 10 parts of solid polyethylene having a softening point of 120° C. were obtained.

Example 2

The reactor was prepared as in Example 1 using benzenediazoacetate as the catalyst. The same ethylene pressure was built up, but the temperature was brought to only 50° C. After 15 hours at this temperature, the ethylene was released and approximately 6 parts of polyethylene having a softening point of 110° C. were obtained.

Example 3

A reactor was prepared as in Example 1 using benzenediazoformate as the catalyst. The same ethylene pressure was used, but the temperature was brought only to 35° C. After 15 hours at 35° C. a good yield of polymer having a softening point of 105° C. was obtained.

Example 4

The reactor was prepared as in Example 1, except that the catalyst was prepared from 1 part of benzenediazoacetate suspended in 50 parts of water. The same ethylene pressure of 5000 P. S. I. was used as in Example 1, and the temperature was maintained at 55° C. After 15 hours, 7 parts of polyethylene having a softening point of 115° C. were obtained.

These examples are representative of the effectiveness and functioning of the catalyst of the present invention. Substantially all of the catalysts of this type, containing the above disclosed unit of elemental structure, give similar or analogous results in the polymerization of ethylenic unsaturates generally.

It may be noted that the catalyst of the present invention is particularly effective with ethylene and the substituted ethylenes having saturated aliphatic substituents containing from 1 to 6 carbon atoms per substituent.

Thus, the present invention presents a family of substances having a particular characteristic configuration in the primary part of the molecule which serve as excellent polymerization catalysts for the unsaturates generally.

While there are above disclosed but a limited number of embodiments of the catalyst and polymerization process of the present invention, it is possible to provide still other embodiments without departing from the inventive concept herein disclosed. It is therefore desired that only such limitations be imposed on the appended claims as are stated therein or required by the prior art.

The invention claimed is:

In polymerizing ethylene, the process which comprises maintaining ethylene at a pressure of at least 1,000 pounds to the square inch and at a temperature of about 35°–250° C. in contact with bis-benzenediazosuccinate as catalyst of the polymerization, until polymerization is effected.

References Cited in the file of this patent

UNITED STATES PATENTS

| | | |
|---|---|---|
| 2,376,014 | Semon | May 15, 1945 |
| 2,471,959 | Hunt | May 31, 1949 |

FOREIGN PATENTS

| | | |
|---|---|---|
| 682,420 | Great Britain | Nov. 12, 1952 |

OTHER REFERENCES

Price: Annals N. Y. Acad. Sci. XLIV, pages 351–355 (November 1943).